United States Patent
Ramslie

(10) Patent No.: US 9,599,254 B2
(45) Date of Patent: Mar. 21, 2017

(54) APPARATUS AND METHOD FOR INSTALLATION AND PROTECTION OF SUB SEA CABLES

(71) Applicant: Seatower AS, Oslo (NO)

(72) Inventor: Sigurd Ramslie, Quinns Rocks (AU)

(73) Assignee: Seatower AS, Oslo (NO)

( * ) Notice: Subject to any disclaimer, the term of this patent is extended or adjusted under 35 U.S.C. 154(b) by 0 days.

(21) Appl. No.: 14/761,695

(22) PCT Filed: Jan. 21, 2014

(86) PCT No.: PCT/EP2014/051088
§ 371 (c)(1),
(2) Date: Jul. 17, 2015

(87) PCT Pub. No.: WO2014/114620
PCT Pub. Date: Jul. 31, 2014

(65) Prior Publication Data
US 2015/0354728 A1    Dec. 10, 2015

(30) Foreign Application Priority Data

Jan. 22, 2013   (NO) .................................. 20130136

(51) Int. Cl.
*F16L 1/19*     (2006.01)
*F16L 1/26*     (2006.01)
(Continued)

(52) U.S. Cl.
CPC ................ *F16L 1/19* (2013.01); *E02B 17/02* (2013.01); *E02B 17/025* (2013.01);
(Continued)

(58) Field of Classification Search
CPC ...... E02B 17/02; E02B 17/025; E02B 17/027; E02B 2017/0095; F16L 1/161; F16L 1/19;
(Continued)

(56) References Cited

U.S. PATENT DOCUMENTS 3,219,119 A * 11/1965 Matthews, Jr. ......... E02B 17/00
                                                     166/346
3,434,296 A *  3/1969 Geer ................... E21B 43/0107
                                                     166/343
(Continued)

FOREIGN PATENT DOCUMENTS

FR    2378227 A1    8/1978
GB    2190971 A    12/1987
(Continued)

OTHER PUBLICATIONS

Standring, Michael, "International Search Report," prepared for PCT/EP2014/051088, as mailed Jul. 4, 2014, four pages.

*Primary Examiner* — Sunil Singh
*Assistant Examiner* — Carib Oquendo
(74) *Attorney, Agent, or Firm* — Winstead PC

(57) ABSTRACT

An apparatus for installation and protection of subsea cables comprises at least a first tubular member (1) and at least a second tubular member (2). Both these are arranged to be installed subsea with a subsea foundation (3). This allows passage of cable (29) through it. The first tubular member (1) is arranged telescopically within the second tubular member (2) so as to extract outwardly towards seabed (5) from an end portion (7), with respect to the second tubular member (2), only up to a prefixed length. This ensures that a continuous conduit for the cable is obtained through the scour protection of the foundation (3). The present invention also includes a methodology for installation of the apparatus (Continued)

and a method for installing a cable through the scour protection of the foundation, by using the apparatus.

17 Claims, 9 Drawing Sheets

(51) Int. Cl.
| | |
|---|---|
| F16L 1/16 | (2006.01) |
| F16L 57/06 | (2006.01) |
| F16L 1/20 | (2006.01) |
| H02G 1/10 | (2006.01) |
| H02G 9/02 | (2006.01) |
| E02B 17/02 | (2006.01) |
| E02B 17/00 | (2006.01) |

(52) U.S. Cl.
CPC ............ *E02B 17/027* (2013.01); *F16L 1/161* (2013.01); *F16L 1/207* (2013.01); *F16L 1/26* (2013.01); *F16L 57/06* (2013.01); *H02G 1/10* (2013.01); *H02G 9/02* (2013.01); *E02B 2017/0091* (2013.01); *E02B 2017/0095* (2013.01)

(58) Field of Classification Search
CPC ... F16L 1/207; F16L 1/26; F16L 57/06; F16L 3/00; F16L 1/12; F16L 5/00; F16L 57/02; H02G 1/10; H02G 9/02; E21B 43/0107; E21B 43/0135
See application file for complete search history.

(56) References Cited

U.S. PATENT DOCUMENTS

| | | | | |
|---|---|---|---|---|
| 3,595,312 | A | * | 7/1971 | Matthews, Jr. ..... E21B 43/0107 166/351 |
| 3,702,539 | A | * | 11/1972 | Matthews, Jr. ........... F16L 1/15 285/24 |
| 3,724,224 | A | | 4/1973 | Matthews, Jr. |
| 4,098,091 | A | * | 7/1978 | Desai .................. E21B 43/0107 405/169 |
| 4,273,470 | A | * | 6/1981 | Blomsma ............ E21B 43/0107 166/367 |
| 4,523,877 | A | | 6/1985 | Finn et al. |
| 4,702,647 | A | * | 10/1987 | Esparza .............. E21B 43/0107 166/343 |
| 4,969,776 | A | * | 11/1990 | Bunce .................. E02B 17/021 405/197 |
| 5,145,289 | A | * | 9/1992 | Titus .................. E21B 43/0107 166/350 |
| 5,482,227 | A | * | 1/1996 | Hystad ............... E21B 43/0135 242/615.3 |
| 7,438,502 | B2 | | 10/2008 | Coppola |
| 2010/0196100 | A1 | | 8/2010 | Soe-Jensen |

FOREIGN PATENT DOCUMENTS

| | | |
|---|---|---|
| WO | WO-8200697 A1 | 3/1982 |
| WO | WO-2008139190 A1 | 11/2008 |
| WO | WO-2008151660 A1 | 12/2008 |
| WO | WO-2011141494 A1 | 11/2011 |

* cited by examiner

APPARATUS AND METHOD FOR INSTALLATION AND PROTECTION OF SUB SEA CABLES

FIELD OF THE INVENTION

The present invention in general, relates to an apparatus for installing and protecting a cable under sea and to the methodology for doing so.

Particularly, the present invention relates to a technology for installation and protecting a cable in subsea conditions running from an offshore bottom-fixed structure to other offshore or onshore structures.

TECHNICAL BACKGROUND OF THE INVENTION

In offshore operations such as oil and gas explorations and productions, installing and protecting cables running from an offshore structure resting on seabed, to other offshore and onshore structures is quite common.

Such an offshore structure may be for example a platform/foundation resting on the seabed for supporting a wind turbine. There can be other examples as known to persons skilled in the art all of which fall within the ambit of the present invention, such as a fixed offshore oil or gas facility or an offshore transformer station. It is also known that for the sake of stability, such foundations are frequently provided with scour protection around the base.

Offshore cables are typically heavy, thick and do not bend in sharp curves. They are also quite expensive, sensitive and costly to repair.

Close to the offshore foundation, the cable needs to be protected from for instance excessive movement, over-bending and damage from dropped objects. Excessive movement is most likely to occur during the installation phase, while the risk for over-bending is often a product of under-scouring of the cable and ensuing free span.

Dropped objects are primarily rocks dumped around the foundation to prevent scouring of the foundation, but also include non-intentionally dropped objects throughout the operational life of the cable. Hence, installation and protection of the cable between the outer edge of the scour protection and point of its entry into the foundation is of vital importance. The cables extend from the seabed to the foundation on the seabed and then to the structure supported by the foundation.

The current state of the art consists of various forms of sheathing or pipes that are installed around the cable, usually at the time of cable installation. The cable is usually installed significantly later than the foundation and its scour protection. Ideally, the cable should go under the scour protection, in which case a costly operation is needed to remove the scour protection to allow the cable and then replace the scour protection to ensure stability of the foundation.

The cable conduits inside the offshore structure will typically be curved (this is always the case for offshore wind foundations). Telescopic arrangements are conventionally thought of as comprising two straight elements, which fit into each other and allow the same shape (straight tube) to be maintained throughout the adjustment of length. Thus, traditional telescopic arrangement is not possible here. A key point of the invention is that the inner tube is elastic, which allows it to assume the shape of the outer tube in retracted position and to return to an essentially straight shape after extension.

Installation and protection of subsea cables extending from, on or into the seabed, to the wind turbine or other structures supported by a foundation, with the help of tubular structures such as J-tubes, are known. Apart from the problem stated in the preceding paragraph, the requirement for divers became almost indispensable for installing such cables into the J-tubes. Even using telescopic J-tubes did not help because divers were required to lock the J-tube in place after installation.

U.S. Pat. No. 7,438,502 teaches a telescopic under-water guiding assembly for subsea elements such as cables. It teaches a telescopic assembly of an outer receiver pipe to which is slidably engaged an inner extension pipe, which can undergo extraction and retraction. A cone end is secured to the inner extension pipe. The latter is locked in a fixed position with binding blocks with set screws.

The above patent does away with the requirement for deploying divers; however it does not teach how the requirement for removal of the scour protection, during its installation can be dispensed with. Further, it does not specifically teach that the protective apparatus can be installed along with the foundation. Furthermore, the arrangement is fairly complicated. These aspects are true for other prior art teachings as well.

US 2010/0196100 shows a tubing arrangement for an offshore facility where a first tube section comprising a curved part is affixed to the outside of an offshore structure and extends from above the sea surface to near the seabed. A second tube part is hinged to the lower end of the first tube part. A third flexible tube part is attached to the outer end of the second tube part. During installation of the structure, the third flexible tube part is coiled up and the second part is pivoted upwardly. When the structure has been installed, the second part is pivoted downward towards the seabed and the flexible tube part is coiled out. The end result is a conduit for a cable or the like to be installed, which extends vertically along the structure and curves into a direction substantially parallel with the seabed.

Although, this arrangement can provide for post-installation of a cable after scour protection has been deployed, it has some major disadvantages. The most important disadvantage is that the tubing is arranged so that it is highly subject to damage during installation. This is especially true for the second and third parts, which extends substantially outward from the structure during installation.

U.S. Pat. No. 7,438,502 shows a straight telescopic tube that is adapted to extend from the deck of a platform to the seabed. The tube can be extended to adjust the length of the tube.

The tube of U.S. Pat. No. 7,438,502 is not suitable for conducting a cable or the like below a scour protection. The tube will form a straight line set at an angle from the deck to the seabed and at best extend above any scour protection. Hence, it permanently installed, the tube will be subject to potential damage from any ships that come too close to the structure. It will also be subject to damage from waves and currents.

U.S. Pat. No. 3,724,224 shows a J-tube that may be pre-installed within the seabed structure. A pipe can be pulled through the J-tube. This pipe is fed from the platform deck after the installation and is pulled along the seabed to another platform. The pipe is exposed between the first and the second platforms. Hence, the pipe has to be installed before any scour protection is deployed around the first platform. If the pipe has to be replaced, the scour protection covering the pipe has to be removed.

U.S. Pat. No. 4,523,877 shows an arrangement similar to U.S. Pat. No. 3,724,224. Here a J-tube is preinstalled within a structure. After the installation of the structure, a riser is fed through the J-tube. The part of the riser that extends through any scour protection is exposed, so that it is not possible to deploy scour protection before the riser is installed or remove the riser without first removing the scour protection.

FR 2378227 shows a protective cover comprising a plurality of shields that can be stacked inside each other during installation. After the installation, the shields are deployed in an overlapping line to form a protective cover for a pipe or cable. However, this system of shields is complicated to deploy and necessitates the use of a diver. Moreover, it is not possible to feed a pipe or cable from a position above the sea surface to a position outside the cover.

Hence, there has been a need for a simple and efficient apparatus to act as a conduit for installation and protection of subsea cables, which dispenses of the requirement for removal of the scour protection of the foundation, during its installation.

There is also a need for a technology that provides such an apparatus, which can be installed along with the foundation, prior to providing the scour protection. This is to ensure that the apparatus extends for a pre-determined length along the seabed, through the zone in which scour protection is to be applied later, so that the cable can be installed through the scour protection since applied, without the need for removing it.

The present invention meets the above mentioned needs and other associated needs by providing an apparatus which has a first tubular member arranged to move telescopically with respect to the second tubular member, such that both can be installed together with the foundation, through the zone of possible scour protection, before it is applied.

OBJECTS OF THE INVENTION

It is the prime object of the present invention to provide an apparatus which acts as a continuous conduit for installation and protection of subsea cables, which has a simple construction and does away with the requirement for removal of scour protection of the foundation during installation of the cables.

It is another object of the present invention to provide a method for installation and protection of subsea cables, which works in a very simple and efficient manner.

It is a further object of the present invention to provide an apparatus for installation and protection of subsea cables which can be installed along with the foundation prior to the application of scour protection, so that the apparatus extends to a predetermined length and forms a continuous conduit from the top to the seabed, through the scour protection, once applied.

All through the specification including the claims, the words "vessels", "platform/foundation", "J-tube", "protective tube", "cable", "bell mouth", "scour protection", "cable pull-in wire" are to be interpreted in the broadest sense of the respective terms and includes all similar items in the field known by other terms, as may be clear to persons skilled in the art. Restriction/limitation, if any, referred to in the specification, is solely by way of example and understanding the present invention. Further, it is hereby clarified that the term "tubes" should include "pipes", "tubular members" and other similar structures as applicable.

SUMMARY OF THE INVENTION

The above mentioned objects are achieved by an apparatus for installation and protection of subsea cables from a seabed unit, comprising at least one first tubular member and at least one second tubular member, said first tubular member is arranged telescopically on the outside or the inside of said second tubular member, both tubular members being pre-installed within the seabed unit and allowing passage of at least one cable there-through, said first tubular member being adapted to be extracted outwardly from the second tubular member, while said second tubular member remain essentially stationary with respect to said seabed unit, to a position essentially flat on the seabed, in order to extend through a desired zone for scour protection.

The invention also relates to a method for installing a subsea cable from a seabed unit, said method comprises the following steps:

a) pre-installing at least one second tubular member and at least one first tubular member within the seabed unit so that the first tubular member is arranged telescopically with the second tubular member;

b) installing the unit in the seabed while retaining the first tubular member (1) relative to the second tubular member;

c) releasing the first tubular member from the second tubular member;

d) pulling the first tubular member outwardly from the second tubular member, so that the first tubular member extends outwardly essentially along the seabed to a location outside a desired scour protection zone;

e) pre-installing or passing a cable pull-in line through the second tubular member and the first tubular member, so that the pull-in line with a first end extends out from the outer end of the first tubular member, and with a second end extends out from an end opposite of the first tubular member of said second tubular member;

f) attaching a cable to be installed to the first end of the pull-in line;

g) pulling the line pull-in line with the cable trailing;

h) before or after steps f) and g), applying scour protection around the seabed unit and on a part of the first tubular member.

Further favourable features are recited in the dependent claims.

BRIEF DESCRIPTION OF THE DRAWINGS

Having described the main features of the invention above, a more detailed and non-limiting description of a n exemplary embodiment will be given in the following with reference to the drawings.

FIG. 2a shows the stopping means out of engagement with the pipe in a elevation view, FIG. 2b shows the situation in FIG. 2a in a plan view, FIG. 2c shows the stopping means in engagement with the pipe in a elevation view, FIG. 2d shows the situation in FIG. 2c in a plan view.

FIG. 5b is a view of the details of a hinged pull-out bar according to FIG. 5a.

FIG. 5c is a view of the details of a friction clamp shown in FIG. 5a.

DETAILED DESCRIPTION OF THE INVENTION

Figure 1:
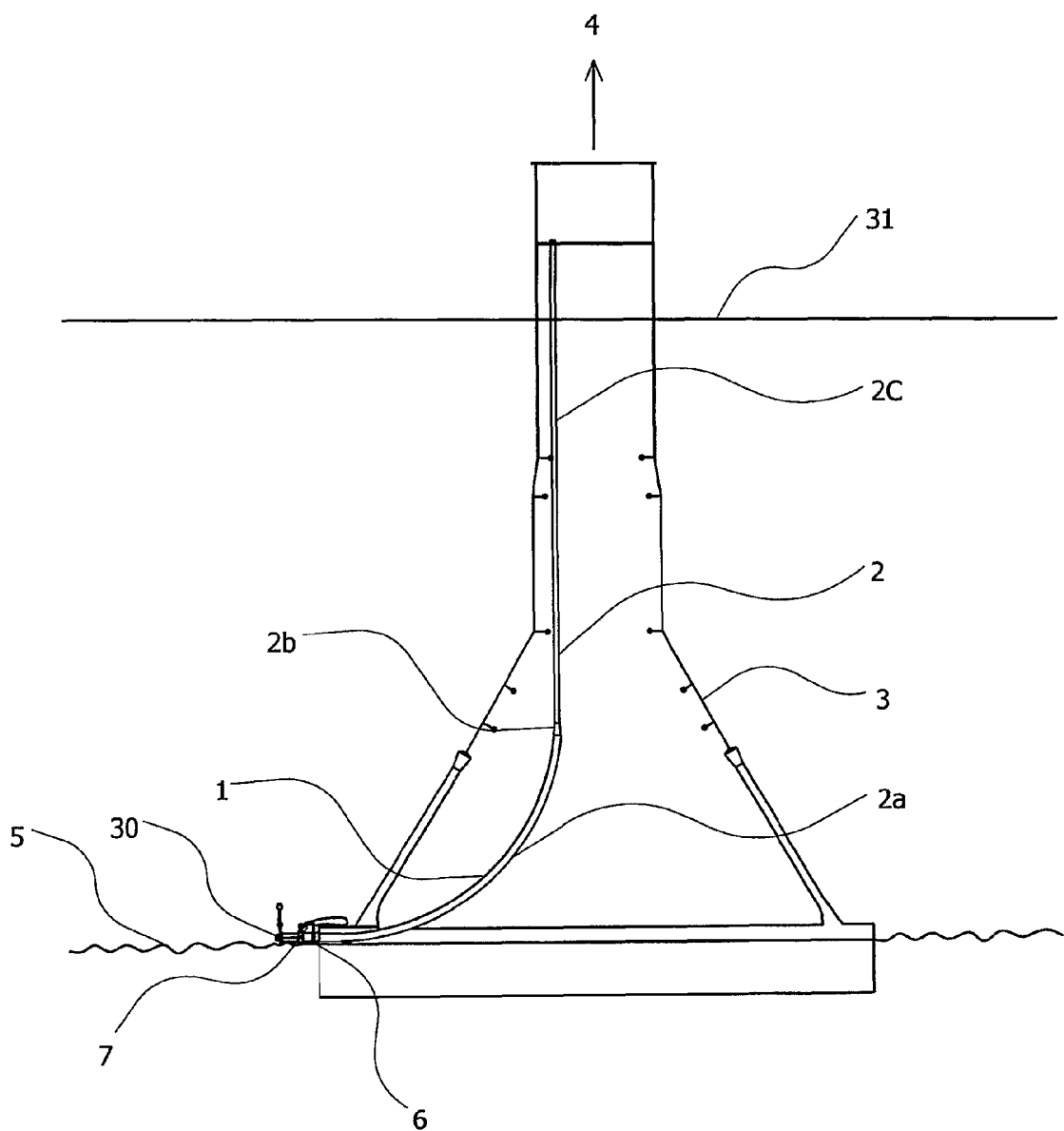
FIG. 1 shows the general arrangement of a foundation in a bottom-fixed condition together with the J-tube and the protective pipe, according to a preferred embodiment of the present invention, with the J-tube yet to be installed on seabed.

The following describes a preferred embodiment of the present invention which is purely exemplary for the sake of understanding the invention and non-limiting to the protective scope.

In all the figures, like reference numerals represent like features. Further, when in the following it is referred to "top", "bottom", "upward", "downward", "above" or "below" and similar terms, this is strictly referring to an orientation with reference to the seabed, where the seabed is horizontal and at the bottom.

It should also be understood that the orientation of the various components may be otherwise than shown in the drawings, without deviating from the principle of the invention.

Additionally, the present invention is explained with reference to a J-tube, within which there is a protective tube, which is telescopically movable with respect to the J-tube. This protective tube is essentially an HDPE tube, but can consist of other suitable materials. It should be understood, that the present invention embraces all such arrangements of two or more tubular members which are capable of being arranged telescopically for forming a continuous conduit for a subsea cable to pass through.

The cables which are proposed to be installed and protected by the apparatus of the present invention, essentially extend from other offshore or on-shore structure(s), on or embedded into the seabed near a foundation resting on the seabed, then into the foundation and up to the structure supported by the foundation.

In most of the figures only one J-tube and one protective tube are shown for the sake of convenience. There can be a plurality of such J-tubes and protective tubes within the foundation according to the present invention. This is true for the various other associated components described. The J-tube and the protective tube may each be a single tube or each may be a number of tubes, attached together to form a J-tube and a protective tube of the present invention.

FIG. 1 is a view of the general arrangement of major components of the apparatus when the protective pipe 1 has not been extracted out to the seabed 5 from the J-tube 2, but still resides within the outer J-tube 2. It shows the foundation 3, which in this example is a gravity based structure (GBS) resting on the seabed 5. The foundation 3 supports a topside structure (not shown) at its top end 4. The topside structure may be a windmill extending upwards from the water surface 31.

Within the foundation 3 is already pre-installed the apparatus of the present invention, which is now to be described. In this example it is a J-tube 2, preferably made of a non-flexible material, such as steel, glass fibre reinforced plastic (GRP), carbon fibre reinforced resin or other suitable material, extending downwards from the top end 4. The J-tube has a conical portion 2b and a curved portion 2a, which has a greater diameter than an upper straight portion 2c. The protective pipe 1 is accommodated within the curved portion 2a of the J-tube 2, between the end 7 of the J-tube and its conical portion 2b. The protective pipe 1 is slidable with respect to the J-tube 2. Thus, it is a telescopic assembly and the protective pipe 1 can be pulled out of the J-tube 2 beyond the end portion 7, by a horizontal pulling force.

The protective pipe 1 is generally made of a somewhat flexible material like High Density Polyethylene (HDPE) which allows it to be inserted into and bent according to the shape of the J-tube 2 and will below sometimes be referred to as HDPE pipe 1. Other materials, such as carbon fibre reinforced resins may also be used.

The FIG. 1 also shows the end portion (bell mouth 30) of the retracted HDPE pipe 1, which is seen coinciding with the end portion 7 of the J-tube 2. A stopping means 6 (explained in detail below) can also be seen which prevents the HDPE pipe from being inadvertently extracted, or retracted once it is installed on the seabed 5. This stopping means 6 is provided in close proximity to the end portion 7. The conical section 2b forms a transition between the curved portion 2a and the straight portion 2c, with a smaller diameter than the curved portion 2a, of the J-tube 2.

FIGS. 2a, 2b, 2c and 2d are detailed views of the end portion 7 of the J-tube 2, showing a preferred embodiment of the stopping means 6. The stopping means 6 prevents extraction or retraction of the protective tube 1 beyond a certain pre-defined limit. It comprises a plate 8a provided near said point of exit, which can slide along vertical stands 8b for engagement with complementary grooves 9 in the outer surface of the protective tube. The grooves 9 are provided at specific points on the protective pipe 1 where it is desired to retain it with respect to the J-tube 2. When the pipe 1 has been pulled out the desired length, the sliding plate 8a, whose rounded profile matches with the diameter of the groove 9, can be inserted into the appropriate groove 9 and lock the movement of the pipe 1.

Figure 2A:
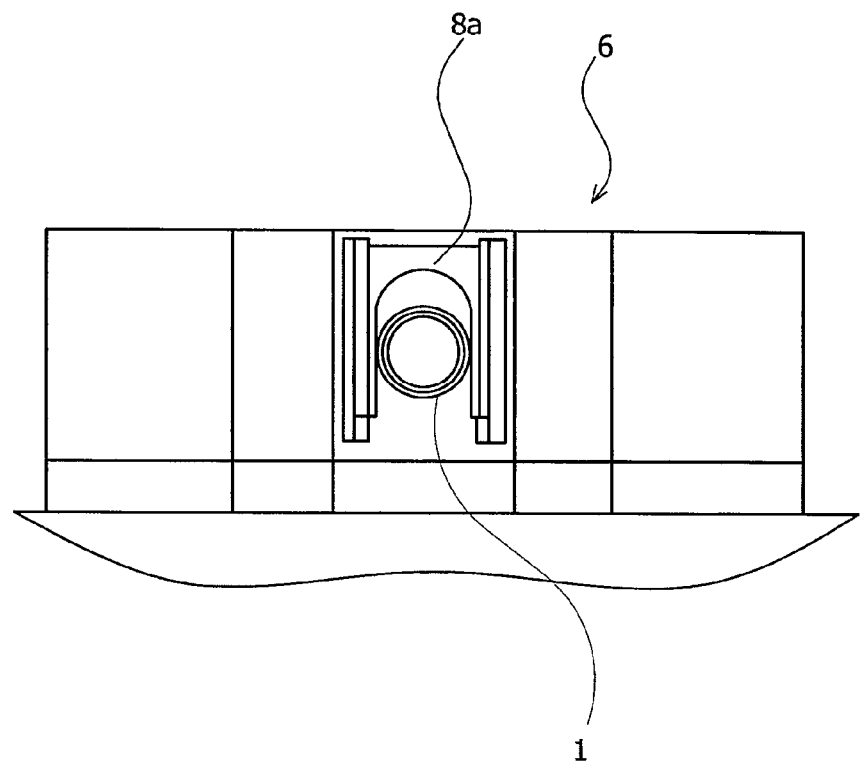
FIGS. 2a, 2b, 2c, 2d show in detail the structure and working of a preferred embodiment of the stopping means according to the present invention, where
Figure 2B:
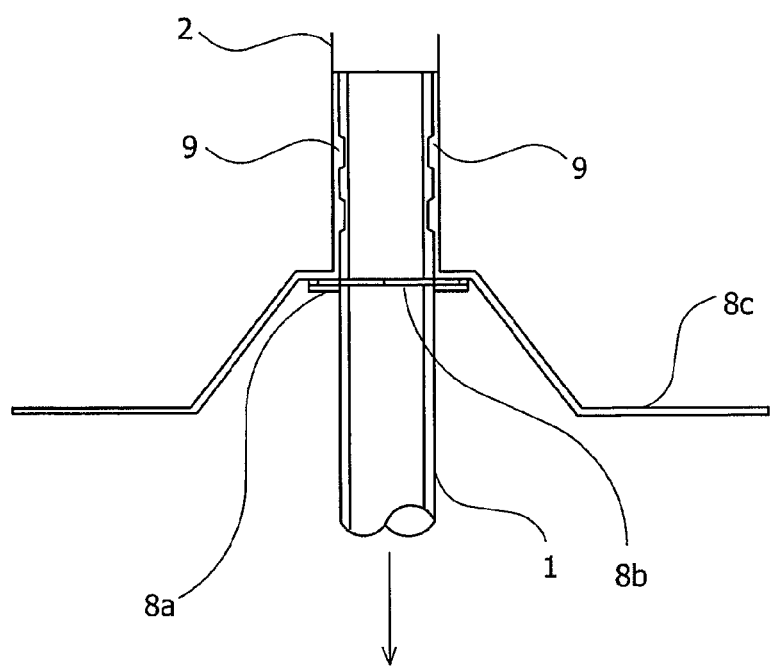
Figure 2C:
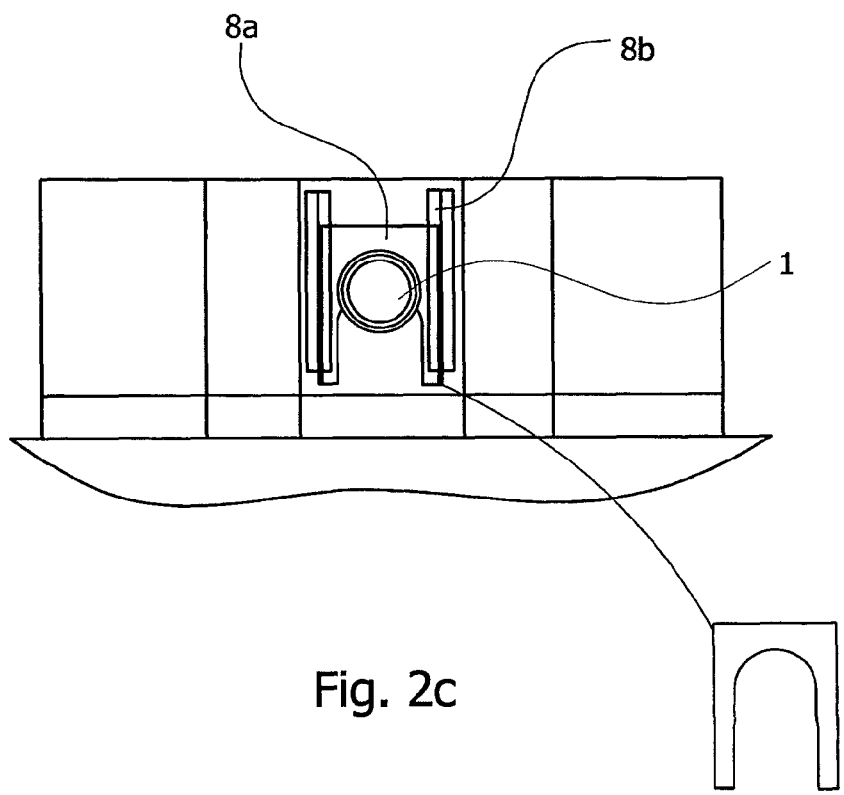
Figure 2D:
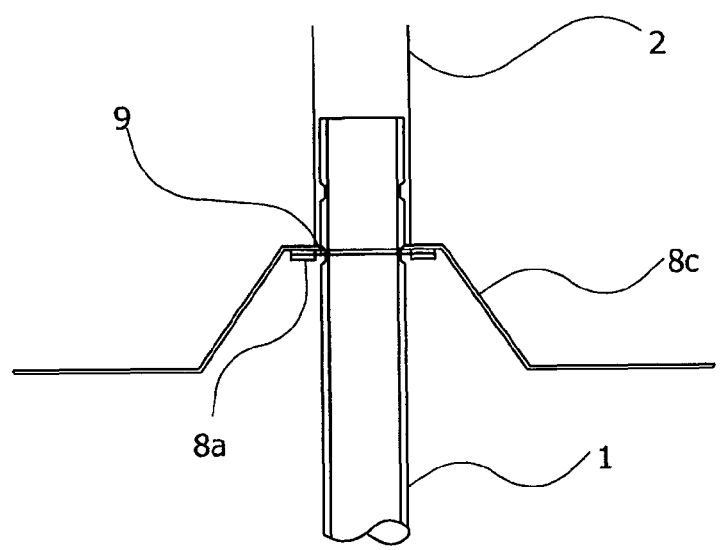

The sliding plate 8a may fall into the groove 9 by gravity or by spring force or may be operated manually by a remotely operated vehicle (ROV) or an actuator (not shown). With this mechanism, the pipe 1 is locked in position with the J-tube 2 and can neither move forward or backward. This would be particularly clear from the front views 2a and 2c which shows two consecutive stages, in the first stage the sliding plate 8a is approaching the grooves 9 but is yet to become engaged. In FIG. 2c the two are in engagement with each other. This would be clear from FIG. 2d as well, of which FIG. 2c is a front view. It shows clearly the engagement between the grooves 9 and the sliding plate 8a. Disposition of grooves 9 along various lengths of the pipe 1 provides the option to selectively predetermine the length of the pipe 1 that will be extracted out of the J-tube. In a separate detail view in FIG. 2c, the plate 8a is shown separated from the rest of the stopping mechanism.

Figure 3:
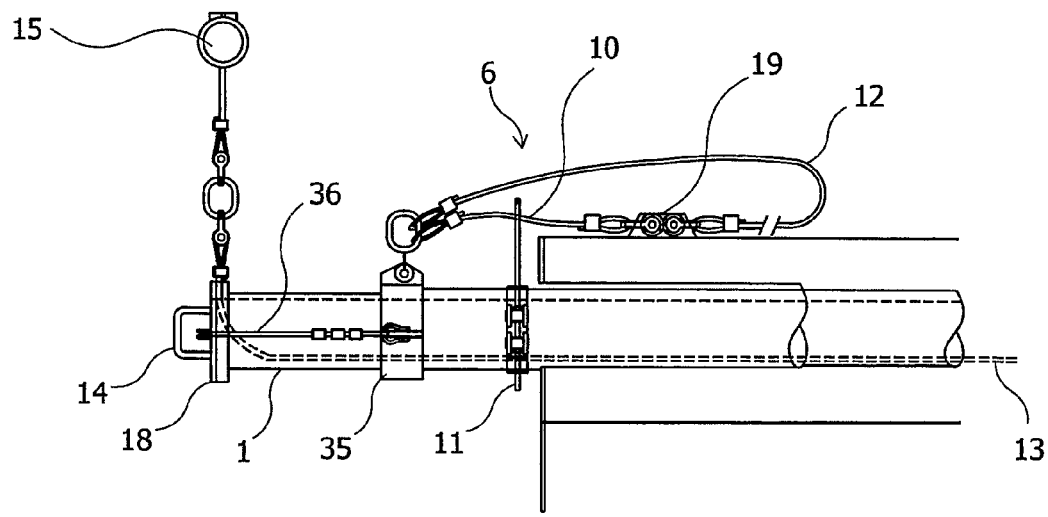
FIG. 3 shows a detail of the outer end of the pipe and the J-tube with another preferred embodiment of the stopping means of the present invention.

FIG. 3 shows another embodiment of the stopping means 6. This comprises a restraining wire 10 is attached to a ring 35 attached to the protective pipe 1. The ring is in turn connected to a cover 18 by a connection wire 36. The cover 18 prevents entry of unwanted material like soil or small rocks into the pipe 1 during installation. The restraining wire 10 is at its opposite end secured to a pad eye 19 fixed to the foundation 3. The restraining wire 10 restrains the protective pipe 1 from extracting out of the J-tube 2. A safety wire 12 is also connected between the ring 35 and the pad eye 19. The safety wire has a length corresponding with the desired extraction length of the pipe 1.

Figure 4A:
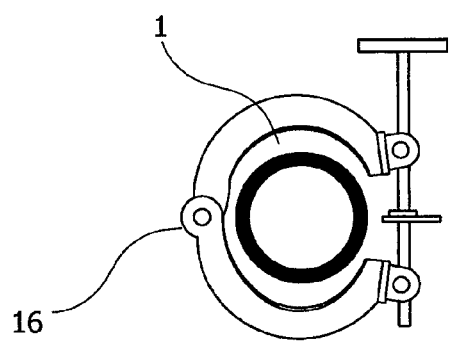
FIGS. 4a and 4b show detail views of the clamp shown in FIG. 3.
Figure 4B:
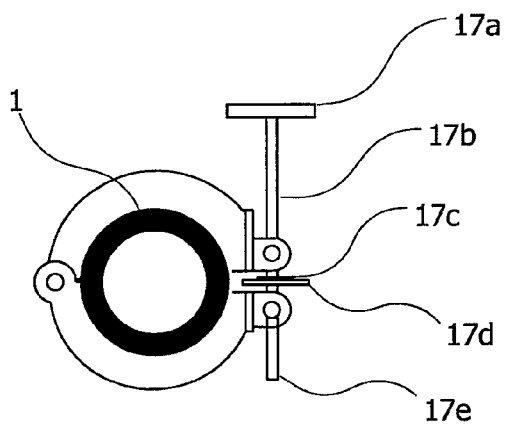

FIG. 3 also shows a clamp 11 near the protective pipe 1 for clamping the same in order to prevent the pipe from retracting into the J-tube when it has been extracted to the desired length. FIG. 4a is an enlarged view of the clamp 11 which is of the hinged type, having a hinge 16. FIG. 4b is an enlarged view of the clamp 11 in operation which shows a T-bar 17a for engagement by an ROV, a right hand thread bar 17b, a stopper plate 17c welded to the thread bar 17b, a plate 17d with an oblong hole (not shown) to allow the thread bar to pass through, and a left hand thread bar 17e.

Referring back to FIG. 3, the cover 18 is equipped with a handle 14 for attachment by a pull-out line (to be explained later) for pulling out the protective pipe 1. FIG. 3 also shows a pull-in line 13, which is used to pull in a cable inside the fully extracted protective pipe 1, as will be explained later, and a monkey fist ROV grab 15 attached to the outer end of the pull in line 13.

Figure 5A:
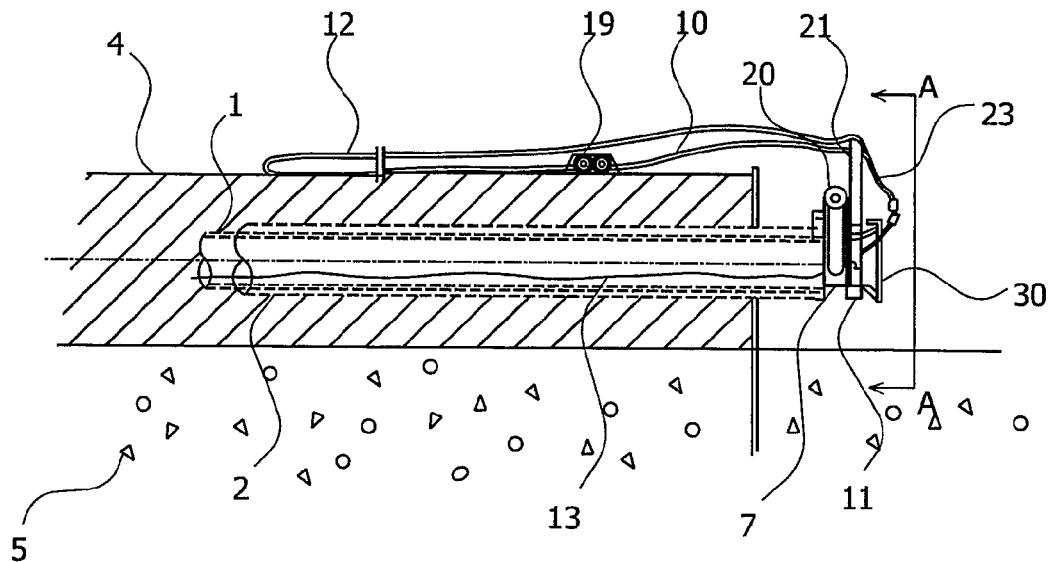
FIG. 5a is a view of the detail arrangement of the protective pipe according to the present invention, prior to its pull-out.
Figure 5B:
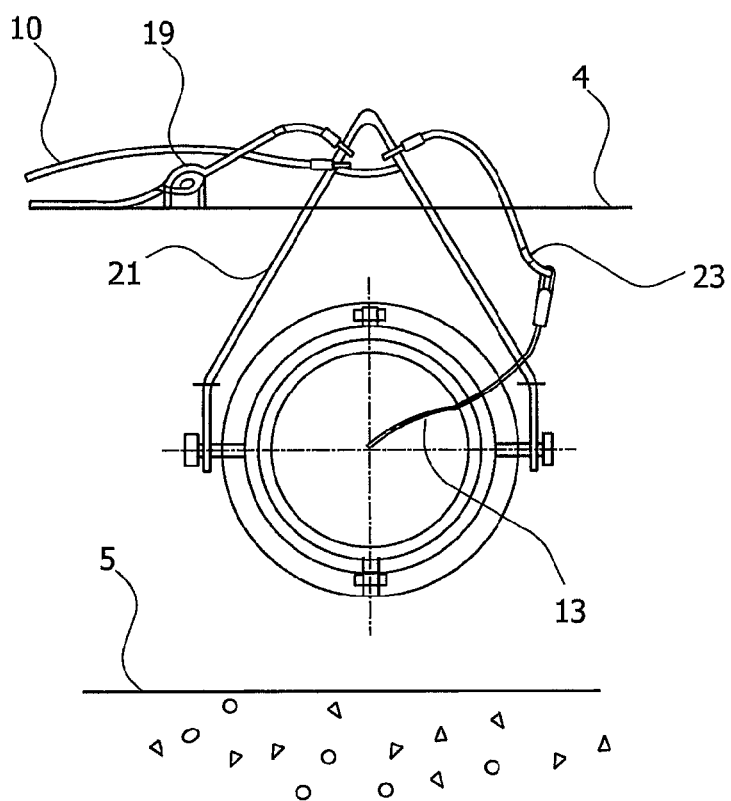

FIGS. 5a and 5b show another alternative embodiment of the stopping means as well as a different embodiment of the means for extracting the pipe 1. Here a friction clamp 20 is preinstalled at the outer end 7 of the J-tube and adapted to clamp the pipe 1, to ensure that after the pipe 1 has been extracted to a desired length, it does not retract back inside J-tube, particularly when the cable 29 (shown in FIG. 9) is pulled in through the protective pipe 1. The clamp 20 is explained in detail in FIG. 5c.

FIGS. 5a and 5b also shows a hinged pull-out bar 21 that is attached to the outer end of the pipe 1 and is to be used for pulling out pipe 1. The hinged pull-out bar 21 is attached to the pipe 1 in close proximity to the end portion 7, and just behind the bell mouth 30. It also shows the cable pull-in wire 13, which in this embodiment is attached to the hinged pull-out bar 21 by a sacrificial wire sling 23. The overall length of the pull-in wire 13, which is, e.g., 20 to 25 meters, may be arranged on a bracket reel (not shown) located at the upper end of the J-tube.

A restraining wire sling 10 is connected to the end portion 7 of the protective pipe 1 to prevent the pipe 1 it from accidentally sliding out during transport and installation of the structure 3. A safety wire 12 is secured to the pad eye 19 fixed to the foundation 3 and is also connected to the pull-out bar 21. The safety wire has a length corresponding with the desired extraction length of the pipe 1. Once fully extracted, through the possible zone of scouring for the foundation 3, the protective pipe 1 cannot retract into the J-tube 2 as it is arrested by the friction clamp 20.

Figure 5C:
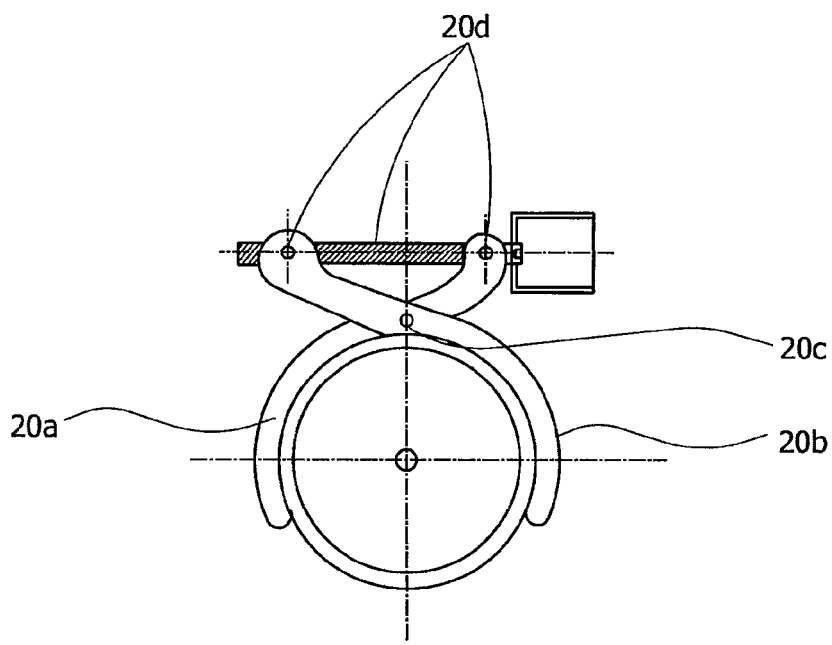

FIG. 5c is a close view of the friction clamp 20 that is used to arrest the motion of the pipe 1 after it has been pulled out. This is actually a tong like arrangement with friction linings on the inner faces. The two arms 20a and 20b are hinged at one end 20c and at the other end threaded bar and nut arrangement 20d are provided for closing the two arms 20a, 20b. This threaded bar and nut arrangement 20d can be operated by an ROV. On activation, the device firmly clamps the pipe 1, without damaging it.

Figure 6:
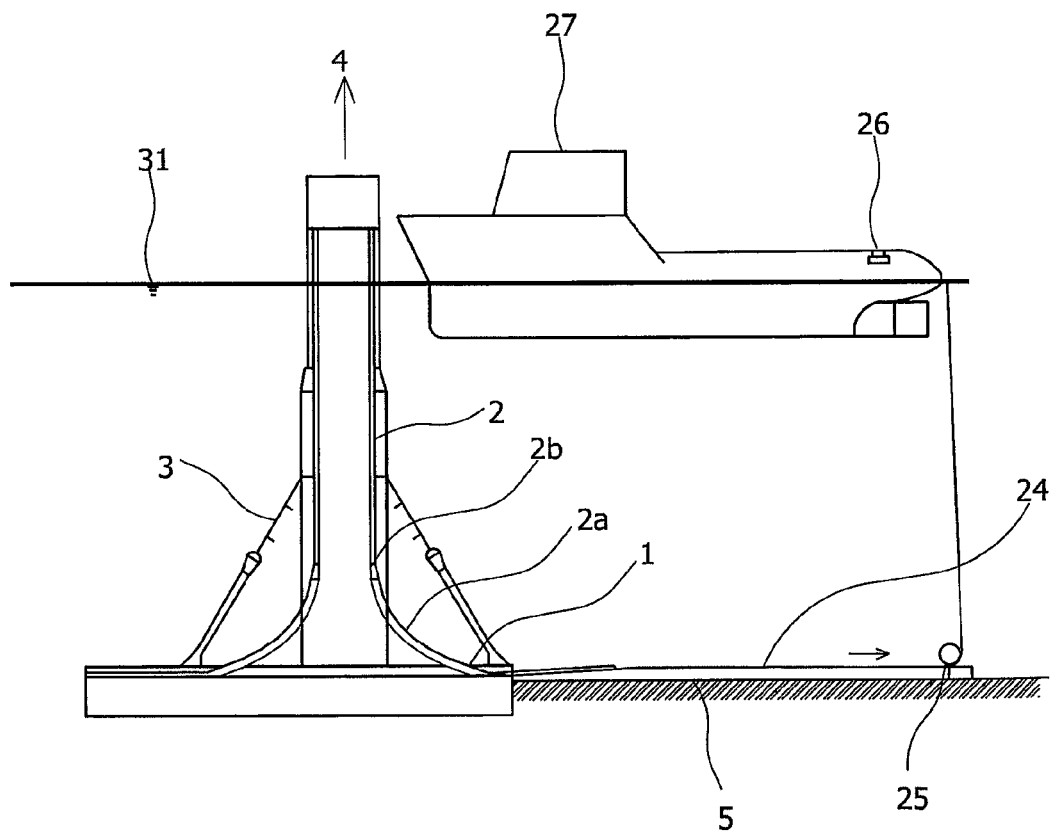
FIG. 6 is a view which explains the method of pulling out the HDPE/protective pipe from the J-tube.

FIG. 6 shows an exemplary arrangement to facilitate the pull-out of the protective pipe 1 from the J-tube 2. It shows two sets of J-tubes 2 and protective pipe 1 within the foundation. In practice, there can be several J-pipes, as explained above. A sling wire 24 is attached to the hinged pull-out bar 21 (shown in FIGS. 5a and 5b) or to the handle 14 of the cover 18, which is fixed to the pipe 1 near the outer end thereof, and is passed through a pulley held near the seabed with a clump weight 25.

The pulling wire 24 is attached to a constant tension winch 26 placed on a vessel 27 on the water surface 31. The pulling wire 24 can thus provide a substantially horizontal pull to the hinged bar 21 and thus to the pipe 1 for smooth extraction from the J-tube 2.

Figure 7:
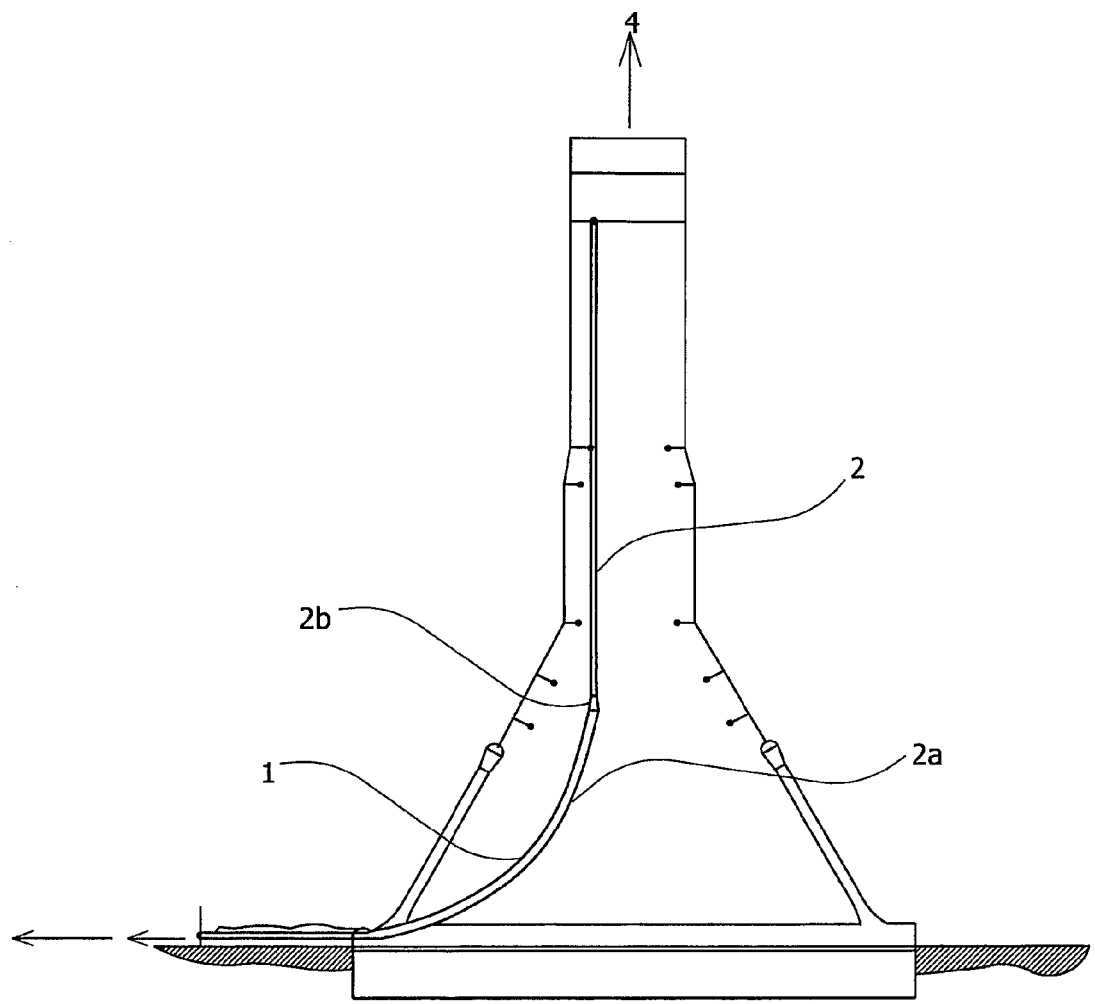
FIG. 7 is a view of a stage when the HDPE pipe has been pulled out of J-tube, awaiting dumping of filter bags.

FIG. 7 is a view of a stage when the protective pipe 1 has been pulled out of the J-tube 2 awaiting placement of sand bags, filter bags or other types of relatively soft material that is able to protect the pipe 1 from the rocks of the scour protection.

Figure 8:
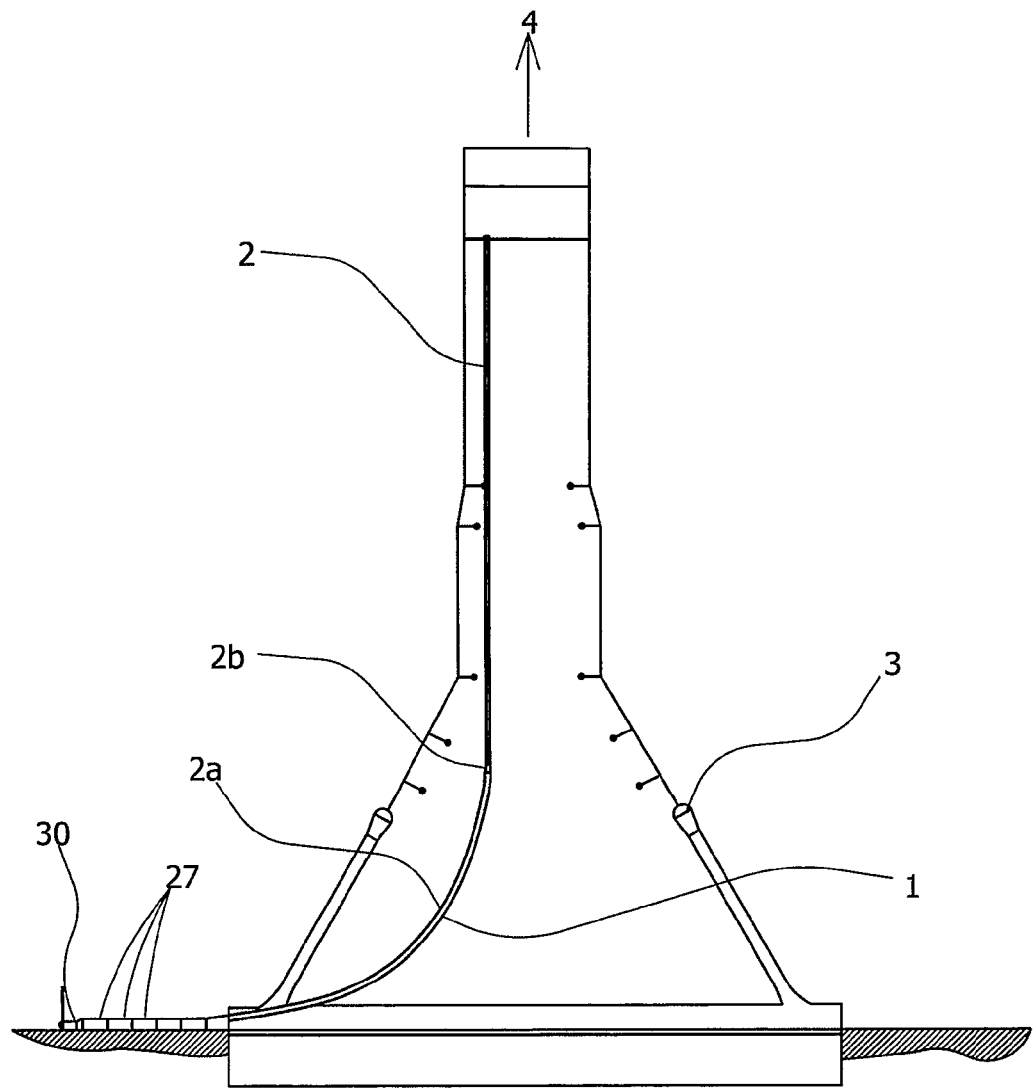
FIG. 8 is a view which shows filter bags that have been placed over the HDPE pipe after extraction and it is ready for the scour protection system to be installed.

FIG. 8 is a view of the stage subsequent to what is shown in FIG. 7. Filter bags 27 have been placed over the protective pipe 1 and is now awaiting application of scour protection. It also shows the bell opening 30 of the fully extracted protective pipe 1 which is outside the possible zone of scour protection. Now scour protection for the foundation 3 is next to be applied.

Figure 9:
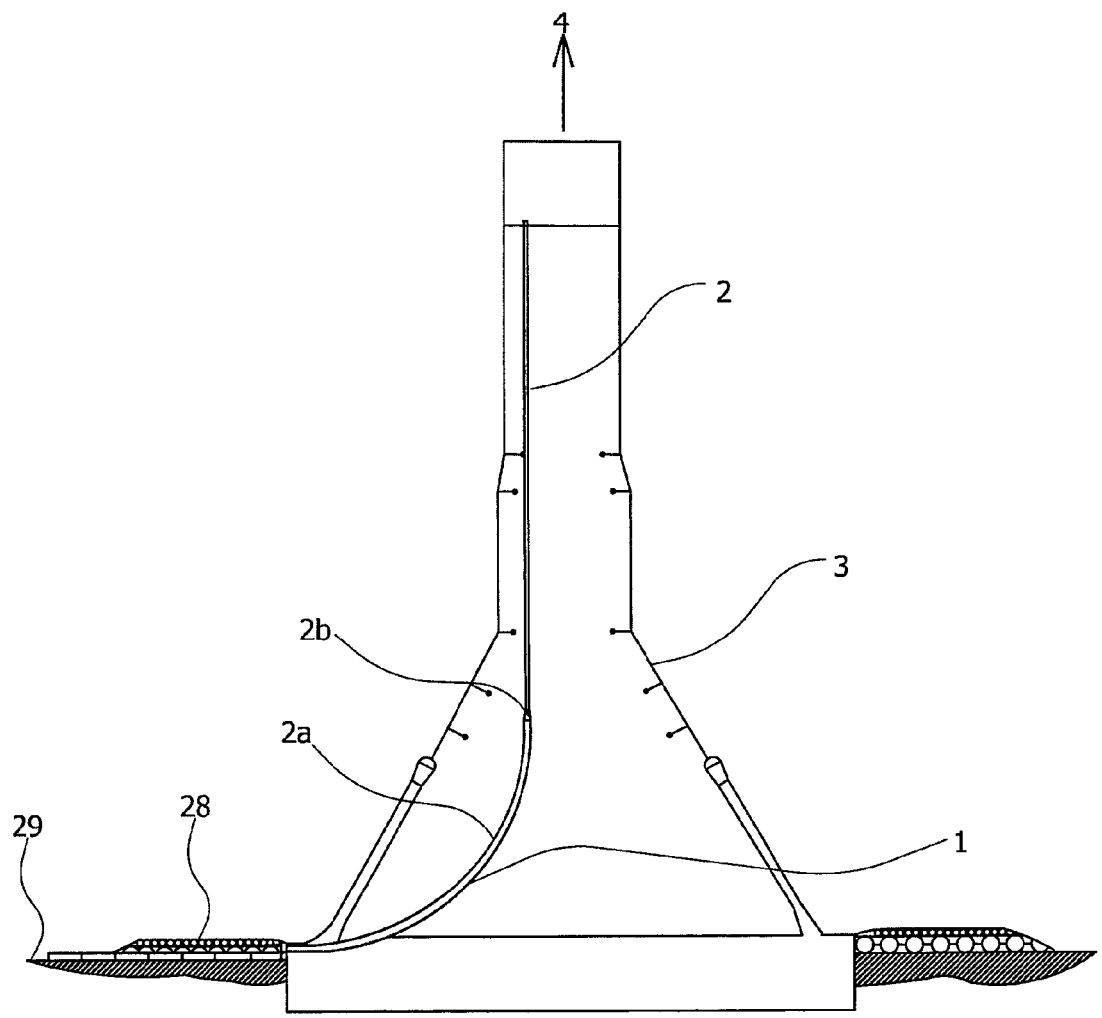
FIG. 9 is view of a stage when scour protection has been completed and the cable is to be installed.

FIG. 9 is a view of a stage when scour protection 28 has been applied and the cable 29 is about to be pulled into the bell mouth 30 with the help of the cable pull-in wire 13 (shown in FIGS. 3 and 5a).

The above figures are again referred to now for the purpose of explaining the operation of installation of the apparatus and the cables so that the functioning of each component, as described hereinbefore is understood.

At the first stage on-shore preparation of foundation 3 for offshore installation is done. First, the protective pipe 1 is inserted into the J-tube 2 and placed within the foundation 3. In this configuration, the protective device 1 is itself protected and does not get in the way of marine operations. This arrangement is shown in FIG. 1. The components shown in FIG. 1 have been explained in detail before with reference to FIG. 1 and are not repeated.

The foundation 3 with the J-tube 2 and protective pipe 1 so installed are now towed to the offshore location. The sacrificial hold back sling 23, connected to the end portion of the protective pipe 1 shown in FIG. 3 or 5a, ensures that the protective pipe 1 does not accidentally slide out of the J-tube 2 during towing. The foundation 3 is thereafter suitably installed on the seabed 5. The installation of the foundation will not be described in detail here, as this procedure is known to persons skilled in the art.

After installation of the foundation 3 on the seabed 5, the hold back sling 23 is cut (preferably by an ROV). Now one end of the sling wire 24 is attached to the hinged pull-out bar 21 or the handle 14. The bar 21 or the handle 14 is fixed to the pipe 1 (as shown in FIGS. 3 and 5a) close to the end thereof. The other end of the sling wire 24 is passed through a pulley held near the seabed with a clump weight 25 and attached to a constant tension winch 26 placed on a vessel 27 on the water surface 31. This provides a substantially horizontal pull to the pipe 1, so that the pipe 1 is smoothly extracted from J-tube 2.

As shown in FIG. 7, the pipe 1 is pulled out in the direction of the arrowhead along the seabed 5. FIG. 8 shows the bell mouth 30 of the fully extracted protective pipe 1. The bell mouth 30 is now outside the application zone of scour protection. Further, it would be clear from FIG. 7 and also from FIGS. 8 and 9, that the J-tube 2 and the fully extracted protective pipe 1 form a continuous conduit for cables from the top portion 4 of the foundation 3 to the seabed, through the zone of scour protection. For that purpose, it is vital that the length of extraction of the protective pipe 1 is predetermined accurately.

On reaching the desired length of pull-out, the protective pipe 1 is locked in position by suitable stopping means 6, as explained with reference to FIGS. 2a, 2b, 2c, 2d, 5a and 5c. This stopping means 6 ensures that once the maximum length of extraction of the protective pipe 1 is reached, it neither retracts back, say during cable pull-in through the extracted protective pipe 1 and J-tube 2, nor accidentally slides further out of the J-tube.

It needs to be explained further with reference to the pull-out of the protective pipe 1 as explained in the preceding paragraphs, that while the pipe 1 is pulled beyond the intended scour protection area on the seabed 5, it simultaneously pulls the cable pull-in wire 13 along with it. The cable pull-in wire 13 is attached to the hinged pull-out bar 21 with a sacrificial sling 23 as shown in FIG. 5a or is prevented to escape into the pipe 1 by the cover 18, as shown in FIG. 3. The cable pull-in wire 13 thereby passes through the J-tube 2 and protective pipe 1. Actually prior to pull-out of the pipe 1, this wire 13 is made to pass through the J-tube 2 and the pipe 1 such that one end of this wire extends out of the outer end of the pipe 1 while the other end extends out of the J-tube at its upper end.

After the scour protection 28 is applied, the cable 29, which may already be placed near the bell mouth 30, may be inserted into the bell mouth 30. For that purpose, the pull-in wire 13 is attached to the cable 29 and pulled in through the bell mouth 30 through the extracted protective pipe 1 and up the J-tube 2, pulling the cable 29 with it.

Thus cable installation is achieved after the scour protection has been applied. The need for removal of scour protection is effectively eliminated. This is possible because the protective tube can be pulled out of the J-tube to a pre-determined length. This length is so adapted that the end with the bell mouth 30 of the extracted pipe 1 is beyond the scour protection 28. At this length the pipe 1 will be locked relative to the J-tube.

Thus it is always ensured that the pull-out of the pipe 1 is always unidirectional and maintains the desired, pre-calculated length. Further, as the HDPE pipe 1 is pre-installed in the J-tube 2 and both are installed on the seabed 5 along with the foundation 3, the entire operation is very weather robust.

The present invention has been described with reference to a preferred embodiment and some drawings for the sake of understanding only and it should be clear to persons skilled in the art that the present invention includes all legitimate modifications within the ambit of what has been described hereinbefore and claimed in the appended claims.

As an alternative to the relatively flexible pipe 1, the pipe may also be stiff but curved to correspond with the curvature of the curved portion 2a of the J-tube 2. This means that the pipe 1 will curve upwards when it has been extracted. However, after full extraction, the pipe may be rotated through 90° so as to lay flat on the seabed. This will require a somewhat longer pipe 1, as the pipe will extend in a curve through the scour protection zone.

It is also conceivable to have the pipe 1 telescopically received on the outside of the J-tube 2 Instead of on the inside.

It is also evident that other means for preventing the pipe 1 from sliding inadvertently out of or into the J-tube 2 may be used. Instead of ROV operated means, remotely operated actuators may be attached to the foundation, pipe 1 and J-tube 2.

The invention claimed is:

1. An apparatus for installation and protection of subsea cables from a seabed unit, said seabed unit being of the type which is adapted to be landed on a seabed and stabilized by scour protection, said apparatus having an installation mode before said seabed unit has been landed on said seabed, and an installed mode after said seabed unit has landed on said seabed, said seabed unit having a first end portion adapted to extend above a water surface and a second end portion adapted to rest on said seabed, said apparatus comprising:
   a first tubular member;
   a second tubular member;
   said first tubular member comprising a first end and a second end;
   said second tubular member comprising a first end and a second end;
   said first tubular member being arranged telescopically on an inside of said second tubular member;
   a part of said second tubular member comprises a curved shape extending between a vertical direction and a horizontal direction, said curved shaped part being situated within outer constraints of the seabed unit,
   wherein in said installation mode:
      said first end of said second tubular member resides within said first end portion;
      said second end of said second tubular member resides at or close to said second end portion;
      said first end of said first tubular member resides within said second tubular member; and
      said second end of said first tubular member resides at or close to said second end of said second tubular member so that said first tubular member in said installation mode resides within said second tubular member;
   wherein in said installed mode:
      said second tubular member remains stationary with respect to said seabed unit;
      said second end of said first tubular member is at a distance from said second end of said second tubular member;
      said first end of said first tubular member remains inside said second tubular member:
      said first tubular element is lying flat on said seabed outside of said seabed unit;
      said second tubular member extends through a desired zone for said scour protection; and
      said first and second tubular members together form a conduit for at least one cable to be fed therethrough.

2. The apparatus according to claim 1, wherein in said installation mode, said second end of said first tubular member coincides with said second end of said second tubular member.

3. The apparatus according to claim 1, wherein said first tubular member is a flexible protective pipe and said second tubular member is a non-flexible J-shaped tube.

4. The apparatus according to claim 3, wherein a movement restrictor is provided in close proximity to said second end of said second tubular element, said movement restrictor being selectively adapted to prevent unwanted extraction or retraction of said protective pipe.

5. The apparatus according to claim 4, wherein the movement restrictor comprises a plate provided near said second end of said second tubular element, said plate being slidably received in guides, said plate being adapted for engagement with a selected one of complementary grooves in an outer surface of said protective pipe, and said grooves being provided at selected points along said protective pipe.

6. The apparatus according to claim 4, wherein the movement restrictor comprises at least one restraining line for arresting said protective pipe from being extracted outwards from said second tubular element after a certain length.

7. The apparatus according to claim 4, wherein the movement restrictor comprises a clamp for arresting said protective pipe from being retracted back into said second tubular element once said protective pipe is extracted to a desired length.

8. The apparatus according to claim 7, wherein a friction clamp is adapted to be operated by a remotely operated vehicle (ROV) and is pre-installed at said second end of said second tubular element, said friction clamp upon actuation clamping said protective tube relative to said second end of said second tubular element.

9. The apparatus according to claim 3, wherein a pull-out handle is fixed to the protective tube at said second end thereof for horizontally pulling the protective tube to a pre-determined length from the second tubular element through the desired zone of scour protection before scour protection is applied so that the second end of the protective tube is outside the scour protection.

10. The apparatus according to claim 9, wherein the pull-out handle is adapted for attachment to a pull line for providing said horizontal pulling force, and an opposite end of said pull line is adapted to be attached to a constant tension winch placed on a vessel floating on said water surface through a pulley resting on said seabed.

11. The apparatus according to claim 3, wherein a sacrificial hold back sling is provided to prevent said protective tube from sliding outwards from said second tubular element during towing out and installation of said seabed unit.

12. The apparatus according to claim 1, wherein said first tubular member is a stiff protective pipe.

13. The apparatus according to claim 1, further comprising a pull line extending through said first and second tubular elements, said pull line being adapted for attachment to one end of said at least one cable.

14. A method for installing a subsea cable from a seabed unit, the method comprising:
 a) pre-installing a second tubular member and a first tubular member within the seabed unit so that the first tubular member is arranged telescopically inside the second tubular member;
 b) installing the unit in a seabed while retaining the first tubular member relative to the second tubular member;
 c) releasing the first tubular member from the second tubular member;
 d) pulling the first tubular member outwardly from the second tubular member, so that the first tubular member extends outwardly essentially along the seabed to a location outside a desired scour protection zone;
 e) pre-installing or passing a cable pull-in line through the second tubular member and the first tubular member, so that the pull-in line with a first end extends out from an outer end of the first tubular member and with a second end extending out from an end opposite of the first tubular member of said second tubular member;
 f) attaching a cable to be installed to the first end of the pull-in line;
 g) pulling the line pull-in line with the cable trailing; and
 h) before steps f) and g), applying scour protection around the seabed unit and on a part of the first tubular member.

15. The method of claim 14, wherein the step of retaining the first tubular member relative to the second tubular member after the first tubular has been extended to the desired length prevents the first tubular member from retracting back relative to the second tubular member.

16. The method of claim 15, wherein the step of predetermining the desired length of extraction of the first tubular member by a movement restrictor.

17. An apparatus for installation and protection of subsea cables from a seabed unit, said seabed unit being of the type which is adapted to be landed on a seabed and stabilized by scour protection, said apparatus having an installation mode before said seabed unit has been landed on said seabed, and an installed mode after said seabed unit has landed on said seabed, said seabed unit having a first end portion adapted to extend above a water surface and a second end portion adapted to rest on said seabed, said apparatus comprising:
 a first tubular member;
 a second tubular member;
 said first tubular member comprising a first end and a second end;
 said second tubular member comprising a first and a second end;
 said first tubular member being arranged telescopically on an inside of said second tubular member;
 a part of said second tubular member comprises a curved shape extending between a vertical direction and a horizontal direction, said curved shaped part being situated within outer constraints of the seabed unit,
 wherein in said installation mode:
  said first end of said second tubular member resides within said first end portion;
  said second end of said second tubular member resides at or close to said second end portion;
  said first end of said first tubular member resides within said second tubular member; and
  said second end of said first tubular member resides at or close to said second end of said second tubular member so that said first tubular member in said installation mode resides within said second tubular member;
 wherein in said installed mode:
  said second tubular member remains stationary with respect to said seabed unit;
  said second end of said first tubular member is at a distance from said second end of said second tubular member;
  said first end of said first tubular member remains inside said second tubular member;
  said first tubular element is lying flat on said seabed outside of said seabed unit;
  said second tubular member extends through a desired zone for said scour protection; and
  said first and second tubular members together form a conduit for at least one cable to be fed therethrough
 wherein a movement restrictor is provided in close proximity to said second end of said second tubular element, said movement restrictor being selectively adapted to prevent unwanted extraction or retraction of said first tubular element from said second tubular element.

* * * * *